(12) United States Patent
McBride et al.

(10) Patent No.: US 7,251,951 B2
(45) Date of Patent: Aug. 7, 2007

(54) HEATED SUB-FREEZING AIRFLOW DIVERTER

(75) Inventors: James W. McBride, Santa Ana, CA (US); Roger P. Murry, San Pedro, CA (US); Joseph M. Jensen, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 670 days.

(21) Appl. No.: 10/826,011

(22) Filed: Apr. 16, 2004

(65) Prior Publication Data

US 2005/0230095 A1    Oct. 20, 2005

(51) Int. Cl.
  *F25D 9/00*    (2006.01)
(52) U.S. Cl. .............................. 62/401; 62/172; 165/185
(58) Field of Classification Search ............... 62/172, 62/401, 402, 404; 165/185
  See application file for complete search history.

(56) References Cited

U.S. PATENT DOCUMENTS

| | | | |
|---|---|---|---|
| 2,992,542 A | | 7/1961 | Arthur |
| 3,208,234 A | * | 9/1965 | Messinger ............... 62/172 |
| 3,355,905 A | * | 12/1967 | Berhold et al. ............ 62/156 |
| 4,246,963 A | | 1/1981 | Anderson |
| 4,430,867 A | | 2/1984 | Warner |
| RE32,100 E | | 4/1986 | Rannenberg |
| 4,741,152 A | * | 5/1988 | Burr et al. ................. 60/772 |
| 4,747,748 A | | 5/1988 | Sahlberg |
| 5,025,642 A | | 6/1991 | Brunskill |
| 5,133,194 A | | 7/1992 | Army, Jr. |
| 5,181,384 A | | 1/1993 | Buchmann |
| 5,214,935 A | | 6/1993 | Brunskill |
| 5,279,130 A | | 1/1994 | Donaldson |
| 5,414,992 A | * | 5/1995 | Glickstein ................. 60/782 |
| 5,553,461 A | | 9/1996 | Hitzigrath |
| 5,787,707 A | * | 8/1998 | Hertl et al. ................. 60/297 |

* cited by examiner

*Primary Examiner*—Melvin Jones
(74) *Attorney, Agent, or Firm*—Oral Caglar, Esq.

(57) ABSTRACT

A flow diverter comprises a heat sink array in fluid communication with a turbine outlet and an inlet face of a heat exchanger, the heat sink array comprising a plurality of heat sink elements, the heat sink array being separated from the inlet face by a distance, and the heat sink array being positioned between the turbine outlet and the inlet face such that at least a portion of a fluid flowing from the turbine outlet contacts the heat sink array before the portion of the fluid contacts the heat exchanger inlet face.

50 Claims, 9 Drawing Sheets

HEATED SUB-FREEZING AIRFLOW DIVERTER

GOVERNMENT RIGHTS

This invention was made with Government support under Contract Number M4225 awarded by Lockheed Martin Aerospace. The Government has certain rights in this invention.

BACKGROUND OF THE INVENTION

The present invention generally relates to providing a uniform distribution of airflow to a heat exchanger and, more specifically, to apparatus and methods to improve the distribution of a high velocity (i.e., greater than or equal to about 250 ft/sec) sub-freezing (i.e., less than or equal to the freezing point of water, less than or equal to about 32° F.) airflow provided to an inlet face of a heat exchanger.

In many applications, environmental control systems that provide cooling to various heat loads, may operate utilizing expanding fluids flowing from an outlet of a turbine. Such airflows generally have high velocities of greater than or equal to about 250 ft/sec., and may be at sub-freezing temperatures less than about 32° F., typically as cold as about −30° F. Such airflows may not be evenly distributed upon entering a heat exchanger due to the small area of the turbine exhaust compared to the flow area of the heat exchanger inlet face. For example, such airflows may contain ice or snow created through the expansion cooling of air through the turbine, which can accumulate on, and may block portions of a heat exchanger inlet face that is immediately downstream. The airflow may also be stratified (e.g., non uniformly distributed), thus being preferentially directed to a portion of the inlet face of the heat exchanger.

Accordingly, non-uniform distribution of a high velocity, sub-freezing fluid flow may prevent the heat exchanger from operating in a most efficient manner. For example, the inlet face of the heat exchanger may become blocked by snow or ice formed as the compressed fluid (e.g., air) flows through the sudden expansion at the heat exchanger inlet pan to the inlet face of the heat exchanger. This blockage may require various components of the system to be larger than would be required without the blocking of the heat exchanger face, and/or may require anti-icing measures to be deployed, all of which may reduce the system effectiveness. This problem may exist in fluid conditioning apparatus and systems utilized in, for example, aircraft refrigeration systems such as those that provide environmental controls including cooling to various liquid and other heat loads generated by various components and systems in the aircraft.

In an effort to address the above problems associated with non-uniform distribution of an expansion cooled fluid (e.g., an air flow) to a heat exchanger, such as those that may result from the blockage of the face of a heat exchanger located downstream of a turbine by ice or snow created through the expansion cooling of air through the turbine, systems directed to removal of water from the airflow prior to expansion through the turbine have been used. In one design shown in U.S. Pat. No. 4,246,963, a condenser and water collecting means may be employed prior to the airflow entering the turbine to remove entrained liquid water from the airflow. Unfortunately, a water condenser may add an additional heat load onto the cooling system, and the condenser and water collection means may add additional weight and complexity to an aircraft or other environment in which this system may be located. An anti-ice bypass of bleed air may also be mixed with the cooler expanding air flowing from the turbine outlet to maintain the expanding air above freezing before entering the heat exchanger. However, this approach may result in an energy drain on the overall system which may reduce system performance. Also, neither removal of water and/or the use of bypass air directly address stratification of the expanding airflow that may occur as it contacts the inlet face of the heat exchanger.

Another approach directed to providing uniform distribution of a high velocity, sub-freezing airflow emanating from a turbine to the inlet face of a heat exchanger includes minimizing flow velocity stratification. In one design shown in U.S. Pat. Nos. 5,025,642 and 5,214,935, a back-pressure plate is utilized after the heat exchanger to block a portion of the outlet of the heat exchanger, thus causing the airflow to be more uniformly distributed through the heat exchanger. This approach may be used in conjunction with removal of the water vapor in the airflow prior to expansion of the airflow in the turbine. However, the backpressure created from this approach may adversely affect the efficiency of the system by increasing pressure drop, and the plate and other apparatus may add weight and complexity to the aircraft or other vehicle in which the system may be operating.

Another approach directed to providing uniform distribution of a high velocity, sub-freezing airflow to the face of a heat exchanger includes the use of hollow tubes for header bars disposed directly on the face of, and in physical contact with, the heat exchanger. These tubes may be maintained above freezing (i.e., above about 32° F.) and thus may prevent formation of ice thereon. In one design shown in U.S. Pat. No. 4,246,963, elongated rounded surface hollow header bars traverse the cold air inlet of the heat exchanger to minimize ice formation thereon. However, these header bars do not impact stratification of the air flowing from the turbine outlet prior to the airflow entering the heat exchanger inlet face.

As can be seen, there is a need for an apparatus and method that improves the uniformity of a high velocity, sub-freezing fluid flowing from a turbine outlet, as the airflow contacts the inlet face of a heat exchanger. The need extends to preventing blockage of the heat exchanger face by ice and snow, to minimize stratification of the airflow and ice entering the heat exchanger, and to allowing the systems to operate at optimum efficiencies without the addition of systems, energy demands, and weight detrimental to overall performance.

SUMMARY OF THE INVENTION

In one aspect of the present invention, a flow diverter comprises a heat sink array in fluid communication near an inlet face of a heat exchanger, the heat sink array comprising a plurality of heat sink elements, the heat sink array being separated from the inlet face by a distance, and the heat sink array being positioned between the turbine outlet and the inlet face such that at least a portion of a fluid flowing from the turbine outlet contacts the heat sink array before the portion of the fluid contacts the inlet face of the heat exchanger.

In another aspect of the present invention, a flow diverter comprises a heat sink array in fluid communication between a turbine outlet and an inlet face of a heat exchanger, the inlet face being in fluid communication with an outlet face of the heat exchanger, the heat sink array comprising a plurality of heat sink elements, the heat sink array being separated from the heat exchanger inlet face by a distance, and the heat sink array being positioned between the turbine outlet and the heat exchanger inlet face such that at least a portion of a fluid flowing from the turbine outlet contacts the heat sink array before the portion of the fluid contacts the heat exchanger inlet face to provide a uniform temperature distribution of the fluid across the outlet face.

In still another aspect of the present invention, a fluid flow diverter comprises a heat sink array in fluid communication between a turbine outlet and an inlet face of a heat exchanger, the heat sink array being separated from the inlet face by a first distance, the heat sink array being positioned between the turbine outlet and the inlet face such that at least a portion of a fluid flowing from the turbine outlet contacts the heat sink array before the portion of the fluid contacts the heat exchanger inlet face, the heat sink array comprising a plurality of hollow tubes, the plurality of hollow tubes being arranged essentially perpendicular to the fluid flowing from the turbine outlet, the plurality of hollow tubes characterized by an essentially circular cross section, the plurality of hollow tubes having an outer surface separated from an inner surface by a wall thickness, and the inner surface being in fluid communication with a heat exchange medium, wherein the outer surface of at least one of the hollow tubes is located a second distance of about 5% to about 50% of a third distance between the turbine outlet and the heat exchanger inlet face.

In yet another aspect of the present invention, a cooling air system comprises, a turbine having a turbine outlet in fluid communication with an inlet face of a heat exchanger, the inlet face being in thermal and fluid contact with an outlet face of the heat exchanger, the inlet face being disposed between the turbine outlet and the outlet face of the heat exchanger, a heat sink array positioned between the turbine outlet and the heat exchanger inlet face such that at least a portion of a fluid flowing from the turbine outlet contacts the heat sink array before the fluid contacts the heat exchanger inlet face, the heat sink array being separated from the heat exchanger inlet face by a distance, the heat sink array comprising a plurality of hollow tubes, the plurality of hollow tubes having an outer surface separated from an inner surface by a wall thickness, the inner surface being in fluid communication with a heat exchange medium, the plurality of hollow tubes arranged to the fluid flowing from the turbine outlet to provide a uniform temperature airflow, and water flow distribution of the fluid across the heat exchanger outlet face.

In yet another aspect of the present invention, a fluid flow diverter comprises an expansion chamber or pan having a turbine outlet at a first end and a heat exchanger inlet face at a second end located opposite to, and in fluid communication with the first end, a heat sink array comprising a plurality of heat sink elements disposed within the expansion chamber between, and in fluid communication with the first end and the second end, wherein a portion of a fluid entering the first end contacts the heat sink array prior to the fluid contacting the second end, and wherein the heat sink array is positioned a distance from the second end.

In still another aspect of the present invention, a method of distributing a fluid to a heat exchanger comprises expanding the fluid through a turbine having a turbine outlet in fluid communication with an inlet face of the heat exchanger, diffusing the fluid through the turbine outlet diffuser, contacting a portion of the fluid with a flow diverter arranged between the turbine outlet and the heat exchanger inlet face, the flow diverter comprising a heat sink array, the heat sink array being separated from the heat exchanger inlet face by a distance, and the heat sink array being positioned between the turbine outlet and the heat exchanger inlet face such that at least a portion of the fluid flowing from the turbine outlet contacts the heat sink array before the portion of the fluid contacts the inlet face.

These and other features, aspects and advantages of the present invention will become better understood with reference to the following drawings, description and claims.

DETAILED DESCRIPTION OF THE INVENTION

Figure 1:
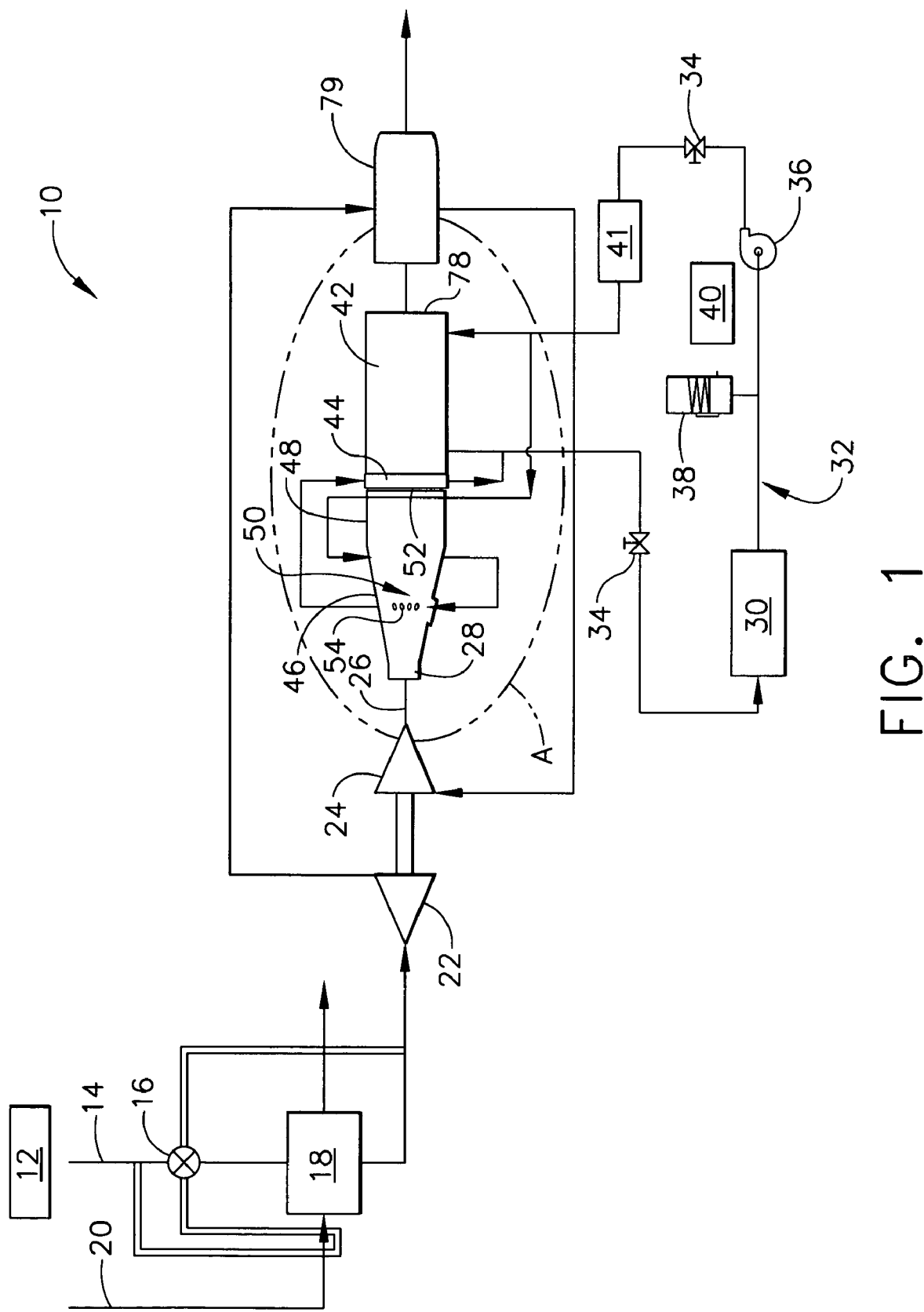
FIG. 1 is a schematic representation of a cooling air system embodying the principles of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a cooling air system comprising a turbo compressor, which may have an outlet that may be in fluid communication with a heat exchanger. In the cooling air system of the present invention, a fluid such as air may be compressed in the compressor. A compressed fluid may then be directed towards the regenerative heat exchanger which may be cooled by exhaust air from an expansion turbine. The cooling air system may be utilized aboard a vehicle, for example aboard an aircraft. Accordingly, the cooling air system may be, for example, an open loop cooling air system. The cooling provided for by the system may be used to cool various heat loads, such as those onboard a vehicle in which the system is located. The cooling air system of the present invention generally provides a flow diverter that may include a heat sink array arranged between an outlet of a turbine, and an inlet face of a heat exchanger, such as those that may be utilized, for example in an open or closed loop aircraft cooling air system. The heat sink array may thus be positioned between the turbine outlet and the inlet face of the heat exchanger such that at least a portion of a fluid flowing from the turbine outlet contacts the heat sink array before the portion of air contacts the inlet face of the heat exchanger. The heat sink array may be spaced away (i.e., positioned a distance away) from the inlet face of the heat exchanger, thus the heat sink array of the present invention may not be in physical contact with the inlet face of the heat exchanger. This is unlike the prior art of cooling air systems, wherein elongated rounded surface hollow header bars that traverse the cold air inlet of the heat exchanger are an integral part of the heat exchanger itself.

In the present invention, an expansion cooled fluid flowing from the turbine outlet may have a high velocity (i.e., a velocity greater than about 250 ft/sec) and the expanding fluid may have a temperature of less than the freezing point of water, about 32° F., with temperatures of less than about −50° F. being possible. The expanding fluid may also contain water, which may be in the form of ice crystals or snow. The heat sink array of the present invention may be maintained at a temperature above the freezing point of water (i.e., a temperature above about 32° F.) while the heat sink array is in contact with the fluid, which may prevent ice crystals from blocking the inlet face. This too is unlike the prior art of cooling systems, wherein water may be removed from the air prior to the air being compressed.

The flow diverter of the present invention may be positioned such that at least a portion of the fluid flowing from the turbine outlet contacts the heat sink array before the portion contacts the inlet face such that a uniform temperature distribution of the fluid may be provided across the entire outlet face of the heat exchanger. This too is unlike the prior art of cooling air systems, which may block a portion of the outlet of the heat exchanger, where the heat exchanger core features a slot that allows cold side flow to bypass the core. The outlet blockage may cause the airflow to be more uniformly distributed through the heat exchanger, but with an increase in backpressure and a decrease in overall heat exchanger and system performance.

Referring now to the figures, and more particularly to FIG. 1, an embodiment of the present invention that provides a cooling air system is shown generally at 10. An engine 12 may have its bleed air 14 pressure regulated with a bleed air valve 16. The resulting bleed air 14 airflow may undergo cooling in a primary heat exchanger 18 by the introduction of ram air 20. The bleed airflow may then undergo compression in a compressor 22, which may be cooled in a regenerative heat exchanger 79. A turbine 24 can receive the airflow from the regenerative heat exchanger 79. An expansion cooled airflow 26 flows from the turbine outlet 28.

The expansion cooled airflow 26 emanating from the turbine outlet 28 may be at its coolest and can serve as a source for cooling radar electronics and other heat loads, represented generally as 30, via a liquid coolant circuit, represented generally as 32, which may in turn be cooled by expansion cooled airflow 26 via a liquid/air heat exchanger 42. The liquid coolant circuit 32 may include various liquid coolant valves 34, a liquid coolant pump 36, a liquid reservoir 38, coolant controls 40 and a coolant filter 41. The expansion cooled airflow 26 may also be utilized for forced-air cooling of avionics (not shown), and cooling of an aircraft cabin (not shown).

The expansion cooled air 26 from the turbine outlet 28 may be in fluid communication with the liquid/air heat exchanger 42 through expansion chamber 48, also referred to as an inlet pan. A portion of the expanding airflow 26 may contact a heat sink array 50 and then contact an inlet face 52 of the heat exchanger 42, pass through the heat exchanger 42, and exit heat exchanger 42 through an outlet face 78 of the heat exchanger.

Figure 2:
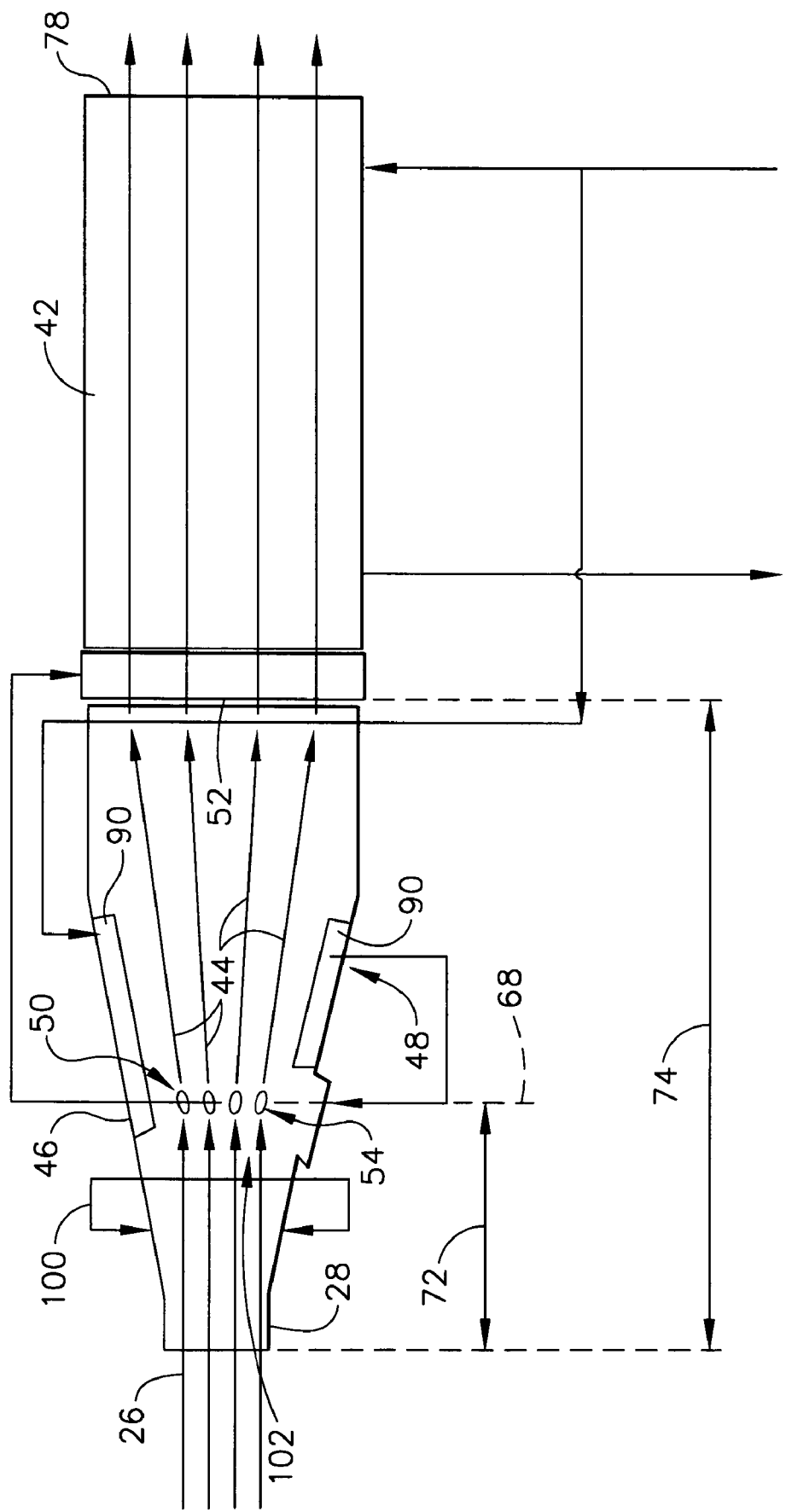
FIG. 2 is an enlarged view showing detail A of FIG. 1.

As better seen in FIG. 2, an embodiment of the present invention may comprise a heat sink array 50, which may be positioned between turbine outlet 28 and the inlet face 52 of heat exchanger 42 such that at least a portion of an expansion cooled fluid flow 26, which may flow from the turbine outlet 28, contacts the heat sink array 50 before the portion of the fluid flow 44 after heat sink array 50 contacts the inlet face 52. The heat sink array 50 may comprise a plurality of heat sink elements 54. Heat from heat load 30 may be provided to heat sink array 50 from liquid cooling circuit 32 and such heat can be in an amount sufficient to maintain surface temperature of heat sink element 54 above the freezing point of water (which may vary depending on the operational conditions of the system, but which may generally be above about 32° F.) while heat sink array 50 may be in contact with expansion cooled airflow 26. Heat from heat load 30 may also be provided to walls 46 of expansion chamber 48 via liquid cooling circuit 32 through a jacket 90 disposed within the walls of expansion chamber 48.

In an embodiment, heat sink array 50 may be spaced away from inlet face 52 and/or from turbine outlet 28, such that heat sink elements 54 of heat sink array 50 may not be in physical contact with turbine outlet 28 or with inlet face 52 of heat exchanger 42. In an embodiment, a plurality of heat sink elements 54 of heat sink array 50 may be arranged in a plane 68 located a first distance 72 between turbine outlet 28 and heat sink array 50, which may be about 1% to about 99% of a second distance 74 located between the turbine outlet 28 and the inlet face 52 of heat exchanger 42. The first distance 72 may preferably be about 5% to about 75% of the second distance 74. In another embodiment, the first distance 72 may be about 10% to about 50% that of second distance 74.

In an embodiment of the present invention, and as an example, the velocity of the expansion cooled airflow 26 flowing from the turbine outlet 28 may have a velocity greater than or equal to about 250 ft/sec. In a further embodiment, the temperature of the expanding airflow 26 flowing from the turbine outlet 28 may be less than about 32° F., with less than about −30° F. in another embodiment, and less than about −50° F. in yet another embodiment.

Figure 3:
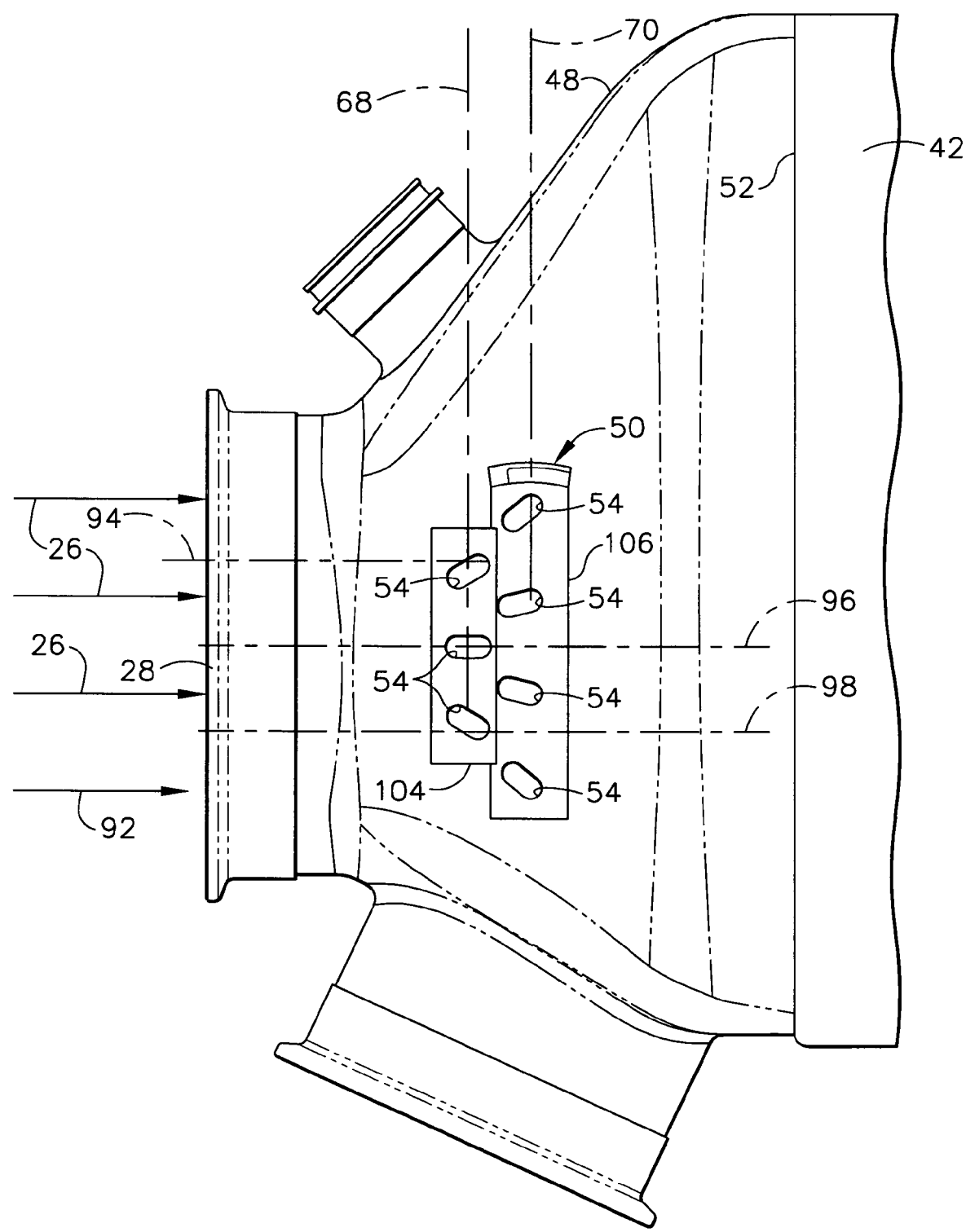
FIG. 3 is a perspective view of an embodiment of the present invention showing a heat sink array disposed within an expansion chamber or pan in front of a heat exchanger.

In such above embodiments, the heat sink array 50 may be arranged within expansion cooled airflow 26 such that at least a portion of the airflow 26 may contact heat sink array 50 to produce an airflow 44 which may have a velocity reduced from that of airflow 26. As an example, the velocity of airflow 26 may be about 5 or more times greater that a velocity of airflow 44, which may be in contact with inlet face 52 (e.g., located within expansion chamber 48 after heat sink array 50). As another example, the velocity of airflow 26 located within expansion chamber 48 prior to heat sink array 50 may preferably be about 10 or more times the velocity of the airflow 44 in contact with inlet face 52. In still another example, the velocity of airflow 26 located within expansion chamber 48 prior to heat sink array 50 may be about 20 or more times the velocity of airflow 44 in contact with inlet face 52. The reduction in velocity provided by airflow 26 contacting heat sink array 50 provides for a uniform distribution of the airflow and entrained humidity 44 to the inlet face 52 of the heat exchanger. Accordingly, the reduction in the velocity of airflow 26 provided by contacting with heat sink array 50 may result in mixing and diffusion of the airflow 44 within the expansion chamber 48, which in turn may provide a uniform distribution of the airflow and entrained humidity 44 to the inlet face 52. The uniform distribution of the flow 44 to the inlet face 52 thus, may provide for a uniform temperature distribution of the airflow across the outlet face 78, as described in detail below. Referring to FIG. 3, an embodiment of the present invention may include a heat sink array 50 comprising a plurality of heat sink elements 54, which may be arranged in a plurality of planes 68 and 70 within expansion chamber 48 in front of inlet face 52 of heat exchanger 42. In an embodiment, the heat sink array 50 may comprise a plurality of heat sink elements 54 arranged in a staggered configuration with respect to the direction 92 of airflow 26. A staggered configuration of heat sink elements may include a first portion 104 of heat sink elements 54 disposed in a first plane represented by dotted line 68, and a second portion 106 of heat sink elements 54, which may be disposed in a second plane 70. Planes 68 and 70 may each be at the same angle to direction 92 of airflow 26. Heat sink elements 54 may further be disposed in a plurality of planes (e.g., 94, 96, and 98), which may be essentially parallel to the direction 92 of airflow 26. In an embodiment, heat sink elements 54 may be disposed in planes 68 and 70 which are essentially perpendicular to the direction 92 of expanding airflow 26 between the turbine outlet 28 and the inlet face 52 of heat exchanger 42.

Figure 4:
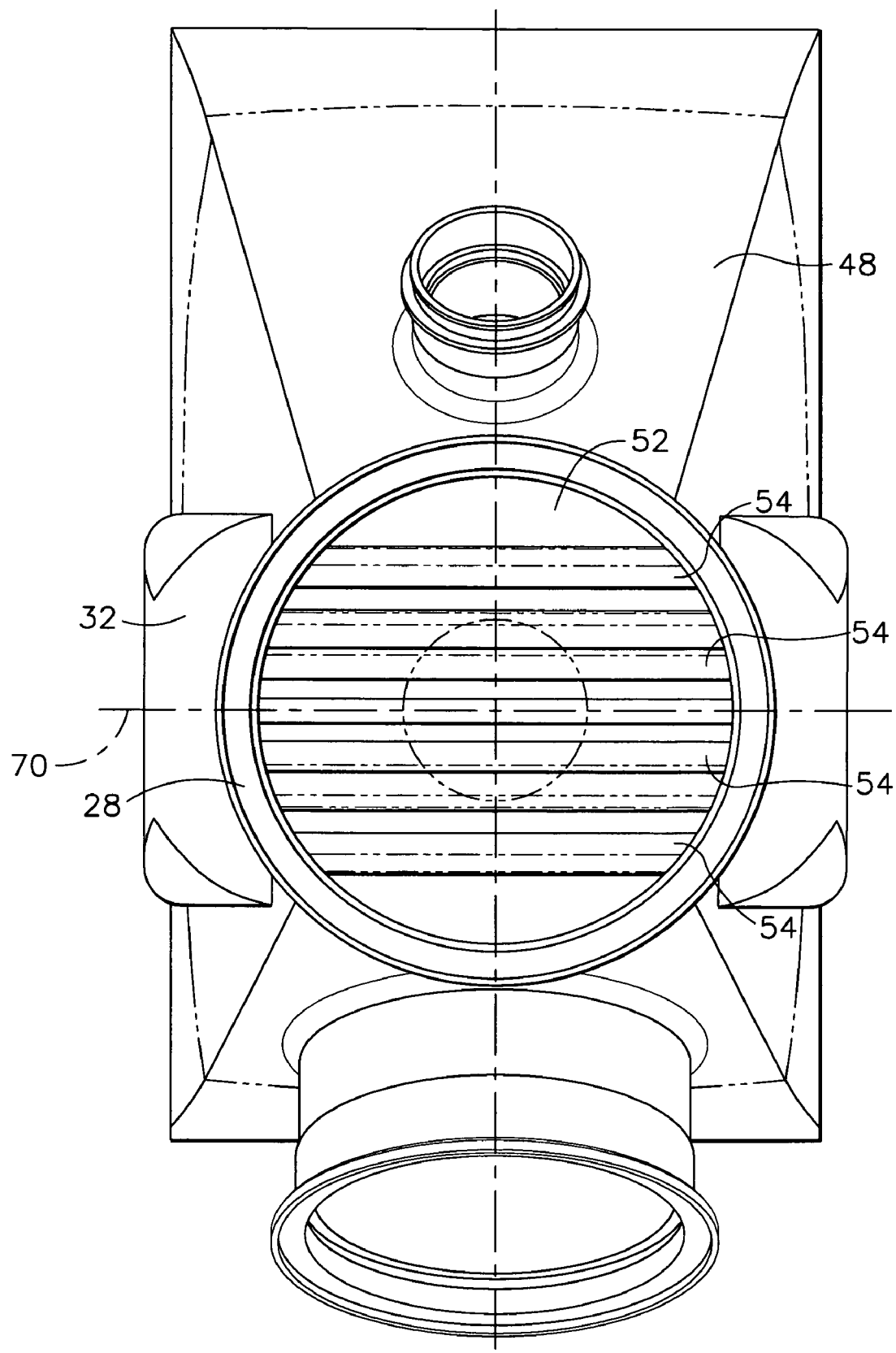
FIG. 4 is a view in the direction of the fluid flow out of the turbine showing an embodiment of the present invention having a heat sink array with a staggered arrangement of elements.

FIG. 4 shows a perspective view of the embodiment shown in FIG. 3, which shows an embodiment in the direction of the fluid flow from the turbine 92. Heat sink elements 54 may be arranged within the perpendicular plane 68 to the direction 92 of the airflow, and may be arranged essentially parallel to each other within planes 68 (obscured in FIG. 4) and plane 70. Furthermore, in an embodiment, heat sink array 50 may comprise a plurality of heat sink elements 54, which may be characterized by a variety of shapes and arrangements described below.

Figure 5:
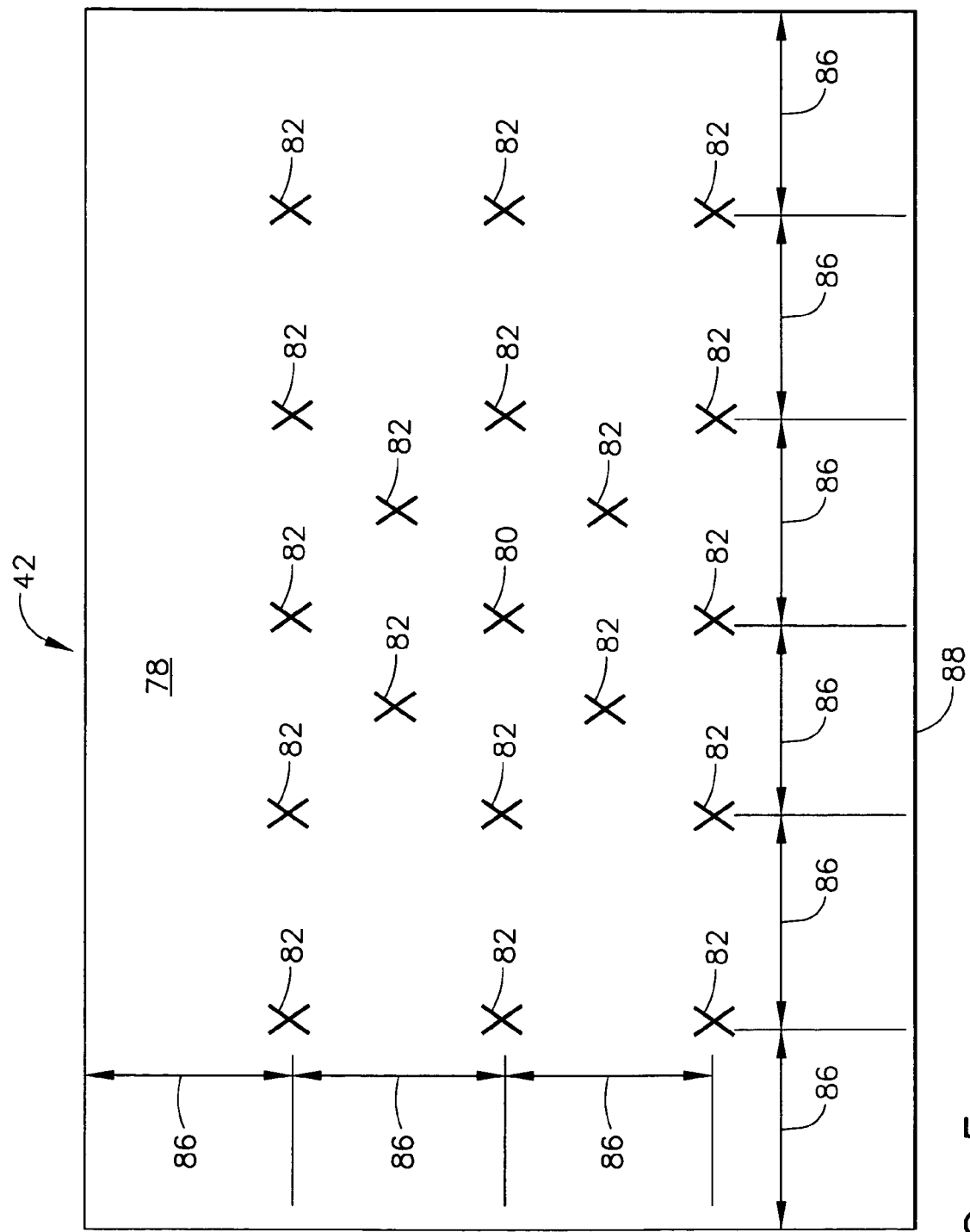
FIG. 5 is a view of a heat exchanger outlet face with temperature measurement locations.

Referring to FIG. 5, a view of an outlet face 78 of a heat exchanger 42 is shown looking into the direction of flow. In an embodiment, an essentially uniform temperature distribution of the airflow across the outlet face 78 of heat exchanger 42 may be characterized by a plurality of temperatures of the fluid 82 measured at the outlet face 78 of the heat exchanger 42 at a plurality of equal and adjacent intervals 86 spanning a line from a center point 80 of the outlet face 78 to an outer edge 88 of the outlet face 78. Accordingly, in an embodiment, the heat sink array 50 may be arranged to contact expansion cooled airflow 26 within the expansion chamber 48 (see FIG. 2) to provide a uniform temperature of the fluid at the outlet face 78 such that the resulting temperature distribution has less-temperature variation from the center point 80 of the heat exchanger face to the outer edge 88. For example, each of five (5) temperatures 82, as an example, of the fluid measured at the outlet face 78 at five (5) equal and adjacent intervals 86 spanning a line from a center point 80 of the outlet face 78 to an outer edge 88 of the outlet face 78, have a total temperature variation of about 6° F. In another embodiment without the use of the flow diverter device, the resulting temperature distribution is more varied with a larger temperature variation of 9° F. from the center point 80 of the heat exchanger to the outer edge 88.

Figure 6A:
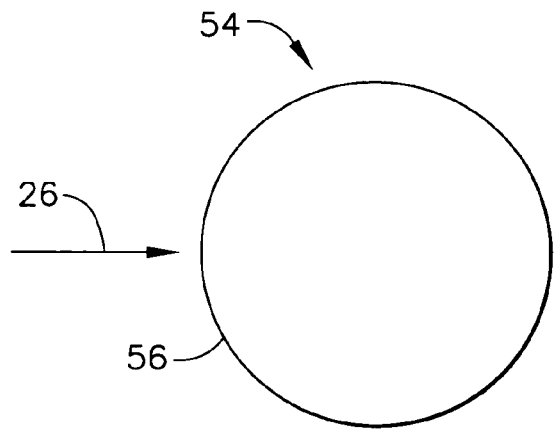
FIGS. 6a-6g are longitudinal, cross sectional views of various embodiments of heat sink elements according to the present invention.
Figure 6B:
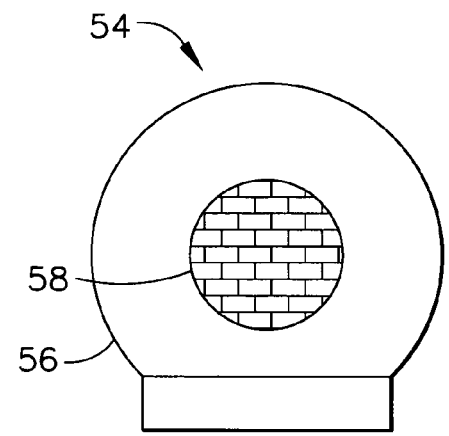
Figure 6C:
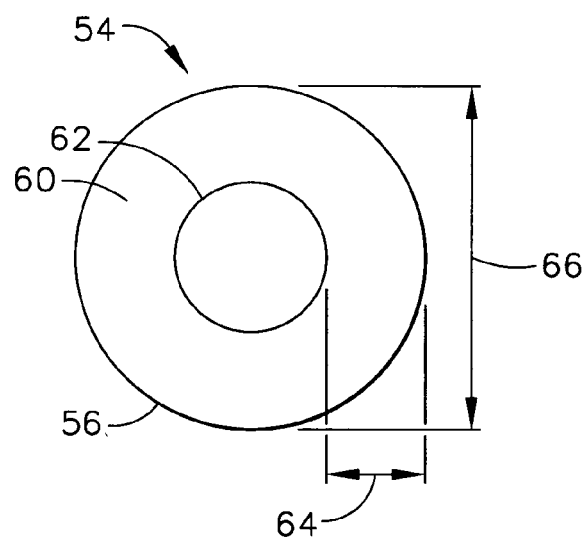
Figure 6D:
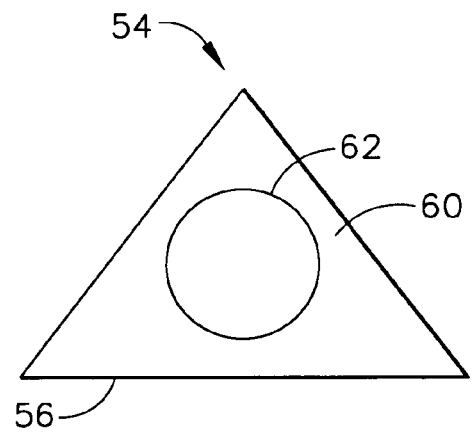
Figure 6E:
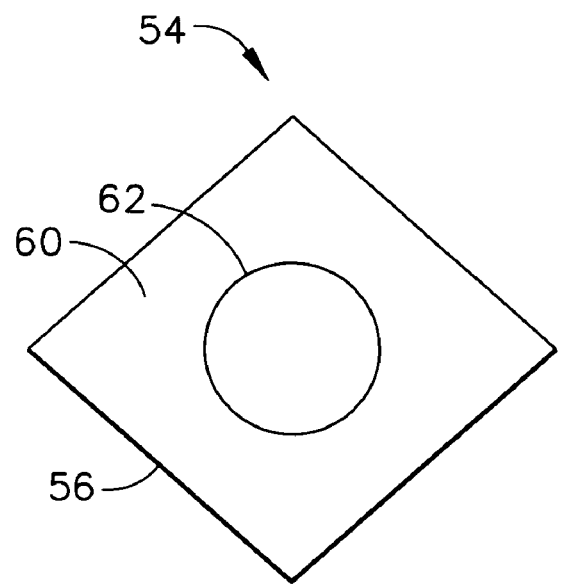
Figure 6F:
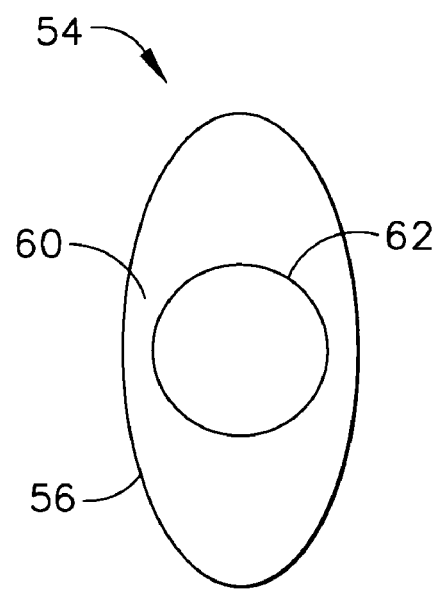

Various cross sectional views of embodiments of heat sink element 54 are shown in FIGS. 6a through 6g. In an embodiment shown in FIG. 6a, heat sink element 54 may include a solid member in thermal contact with heat load 30 (not shown), for example via a heat exchange medium (not shown) provided by liquid cooling circuit 32 (not shown), having an outer surface 56 which may be in physical contact with expansion cooled airflow 26. In another embodiment shown in FIG. 6b, heat sink element 54 may include an electric heater 58 disposed within heat sink element 54. In still another embodiment as shown in FIG. 6c, heat sink element 54 may comprise a hollow member 60 having an outer surface 56 separated from an inner surface 62 by a wall thickness 64. The inner surface 62 may be in fluid communication with a heat load 30 (not shown), for example via a heat exchange medium (not shown) provided by liquid cooling circuit 32 (not shown) having a temperature greater than the freezing point of water. In an embodiment, hollow member 60 may be characterized by an essentially circular cross section (FIG. 6c) and may have an outer diameter 66 greater than or equal to about 4 times wall thickness 64.

Figure 6G:
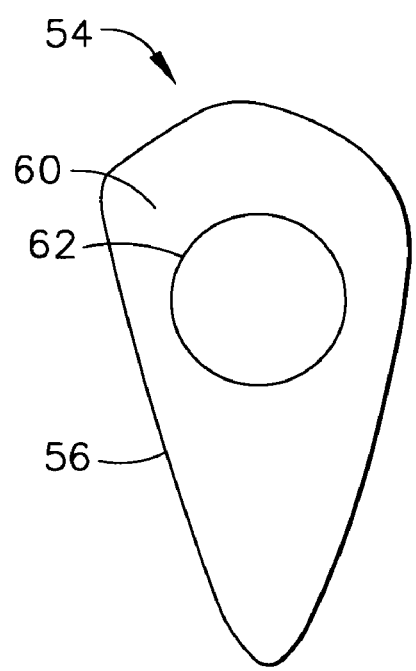

Heat sink element 54 may also be characterized by a cross section comprising a plurality of straight sides, curved sides, or a combination thereof. For example, in embodiments shown in FIGS. 6d-6g, heat sink element 54 may include a hollow member 60 having an outer surface 56, and inner surface 62 and a cross section characterized by a triangular shape (FIG. 6d), a diamond shape (FIG. 6e), an oval shape (FIG. 6f), and/or a tear-drop, aerodynamic shape (FIG. 6g).

Referring to FIGS. 1-6, a method of distributing a fluid such as an expansion cooled airflow 26 to a heat exchanger 42 may include expanding a fluid (e.g., air) through a turbine 24 or other type of device having an outlet 28 in fluid communication, through an expansion chamber 48, with an inlet face 52 of a heat exchanger 42. The method may further comprise contacting at least a portion of the expansion cooled airflow 26 with a heat sink array 50 prior to that portion of the airflow contacting the inlet face 52 of heat exchanger 42. In an embodiment, the heat sink array 50 is positioned a distance from the inlet face 52, and may comprise a plurality of heat sink elements 54, which may be in thermal contact with a heat load such that heat sink elements 54 may be maintained at a temperature above the freezing point of water while in contact with the expansion cooled airflow 26. In another embodiment, the heat sink array 50 may comprise a plurality of hollow members 60, which may be positioned within the expansion cooled airflow 26 to contact at least a portion thereof, which may provide a more uniform mass flow and ice load on the inlet face 52 and result in a more uniform temperature distribution of the airflow across an outlet face 78 of the heat exchanger 42.

EXAMPLES

A test stand designed to simulate an open loop aircraft cooling system similar to that shown in FIG. 1 was utilized in testing the present invention. The test stand was outfitted with a turbine having a turbine outlet in fluid communication with an inlet face of a heat exchanger through an expansion chamber (i.e., an inlet pan). The testing conditions provided a flow of expanding air from the turbine outlet having a temperature of about −40° F. at a velocity of about 250 ft/sec. A simulated heat load was supplied to the heat exchanger, and to the flow diverter of the present invention when applicable. In this example, the flow diverter comprised two rows of four tubes spanning across the inlet pan. The outlet face of the heat exchanger measured about 6 inches in height, and about 10 inches across, as measured from a left face of the heat exchanger. The center point of the heat exchanger was at a height of about 3 inches, and a distance from the left face of about 5 inches. During the test, a plurality of air temperatures were measured at a plurality of intervals equally distributed across the outlet face of the heat exchanger along a grid pattern centered on the line running through the center point of the heat exchanger. The data are summarized in Table 1 below.

TABLE 1

| Sample | Distance from Left Face In. | Height In. | Air Temperature ° F. |
|---|---|---|---|
| Example | 4.5 | 3 | 105 |
|  | 4.5 | 2.4 | 104 |
|  | 4.5 | 1.8 | 102 |
|  | 4.5 | 1.2 | 100 |
|  | 4.5 | 0.6 | 99 |
| Comparative Example | 4.5 | 3 | 105 |
|  | 4.5 | 2.4 | 104 |
|  | 4.5 | 1.8 | 103 |
|  | 4.5 | 1.2 | 99 |
|  | 4.5 | 0.6 | 96 |

Figure 7A:
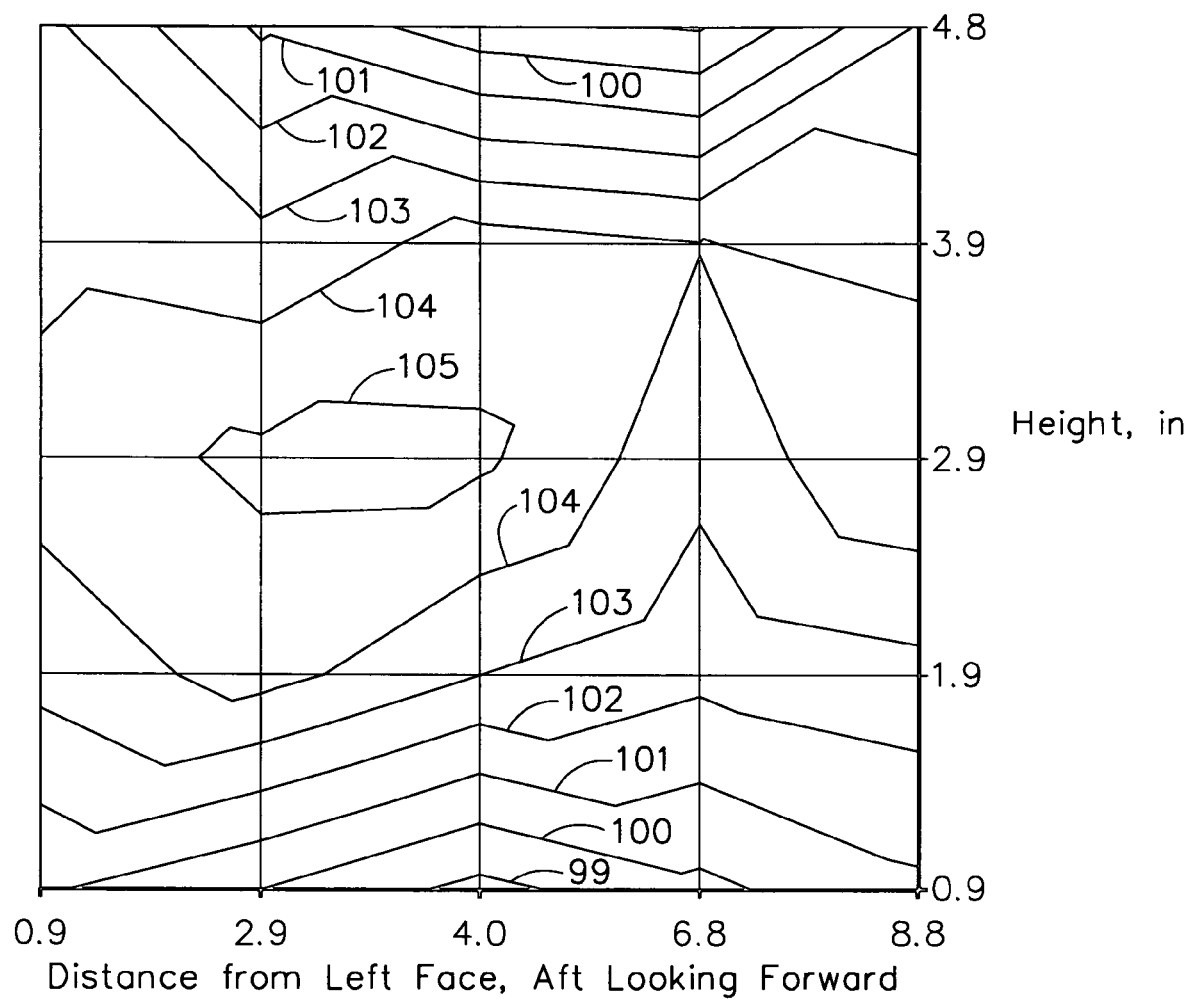
FIG. 7a is a graphical representation of temperatures measured across an outlet face of a heat exchanger according to an example of the present invention.

FIG. 7a shows a two dimensional representation of the air temperature distribution across an outlet face of a heat exchanger of the present invention, wherein a portion of a fluid flowing from a turbine outlet contacts a heat sink array as described above, located a distance away from a heat exchanger inlet, before the fluid contacts the inlet face of the heat exchanger.

Figure 7B:
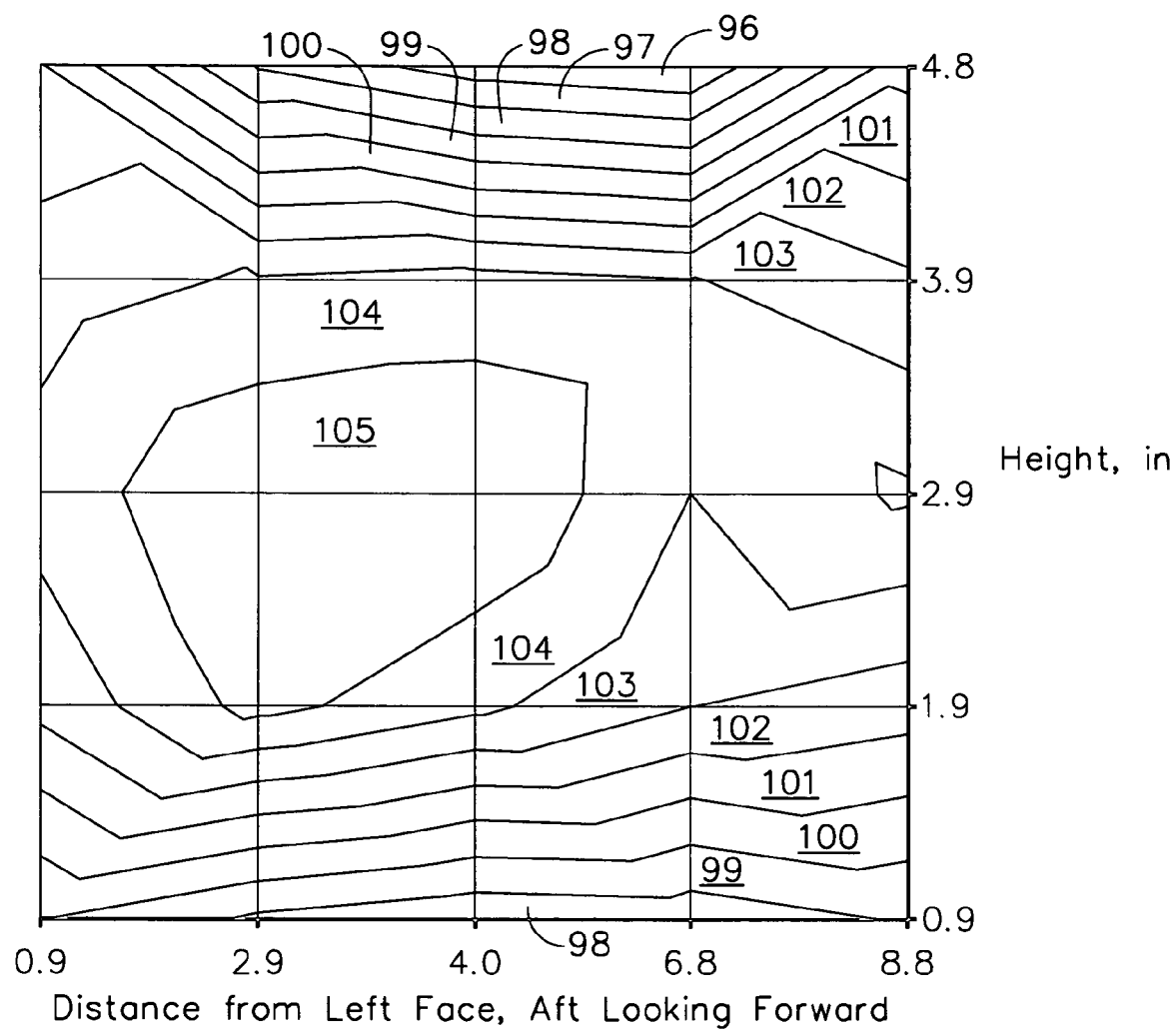
FIG. 7b is a graphical representation of temperatures measured across an outlet face of a heat exchanger according to an example of the prior art.

FIG. 7b shows a two dimensional representation of the temperature distribution across the outlet face of the heat exchanger of the prior art. Comparative Example data was determined taken under essentially identical conditions as used to acquire the data shown in FIG. 7a.

As can be seen from Table 1 and the graphical representations of the data in FIGS. 7a and 7b, a uniform temperature distribution across the outlet face was obtained using the flow diverter of the present invention, as compared to the non-uniform temperature distribution obtained in the Comparative Example. This uniform distribution being characterized by regions having essentially the same temperature, which varying from 99 to 105° F. across the outlet face such that each of a plurality of temperatures of the fluid measured at the outlet face of the heat exchanger at 5 equal and adjacent intervals have a total temperature difference of about 6° F.

A less uniform temperature distribution is seen in the FIG. 7b, showing the temperatures measured across the outlet face of the heat exchanger used in the Comparative Example without the flow diverter described herein. As shown in Table 1 and in FIG. 7b, the temperatures across the outlet face of the Comparative Example vary from 96 to 105° F. across the outlet face, compared to 99 to 105° F. for the Example.

It should be understood, of course, that the foregoing relates to preferred embodiments of the invention and that modifications may be made without departing from the spirit and scope of the invention as set forth in the following claims.

We claim:

1. A flow diverter comprising:
    a heat sink array in fluid communication with a turbine outlet and an inlet face of a heat exchanger,
    said heat sink array comprising a plurality of heat sink elements,
    said heat sink array being separated from said inlet face by a distance,
    said heat sink array being positioned between said turbine outlet and said inlet face such that at least a portion of a fluid flowing from said turbine outlet contacts said heat sink array before said portion of said fluid contacts said inlet face.

2. The flow diverter of claim 1, wherein at least one of said heat sink elements comprises:
    a hollow member having an outer surface,
    an inner surface separated from said outer surface by a wall thickness,
    said inner surface being in fluid communication with a heat exchange medium having a temperature greater than the freezing point of water.

3. The flow diverter of claim 2, wherein said hollow member is arranged essentially perpendicular to said fluid flowing from said turbine outlet.

4. The flow diverter of claim 2, wherein said outer surface is characterized by a cross section comprising a plurality of sides.

5. The flow diverter of claim 2, wherein said hollow member is characterized by an essentially circular cross-section.

6. The flow diverter of claim 5, wherein an outer diameter of said hollow member is greater than or equal to about 4 times said wall thickness.

7. The flow diverter of claim 1, wherein said heat sink array comprises:
    a plurality of hollow tubes,
    each of said plurality of hollow tubes having an outer surface contactable with said fluid,
    each of said plurality of hollow tubes having an outer surface separated from an inner surface by a wall thickness, and
    each of said inner surfaces of said hollow tubes being in fluid communication with a heat exchange medium having a temperature greater than the freezing point of water.

8. The flow diverter of claim 7, wherein said plurality of hollow tubes are each arranged essentially perpendicular to said fluid flowing from said turbine outlet.

9. The flow diverter of claim 8, wherein said plurality of hollow tubes are each arranged essentially parallel to each other.

10. The fluid flow diverter of claim 9, wherein said plurality of hollow tubes are arranged in at least one plane disposed essentially perpendicular to said fluid flowing from said turbine outlet.

11. The fluid flow diverter of claim 10, wherein:
    said plurality of hollow tubes are arranged in a plurality of parallel planes, and
    each of said parallel planes is disposed essentially perpendicular to said fluid flowing from said turbine outlet.

12. The fluid flow diverter of claim 11, wherein said plurality of hollow tubes are arranged in a staggered configuration.

13. The fluid flow diverter of claim 1, wherein a first distance between said turbine outlet and an outer surface of said heat sink element is about 1% of a second distance between said turbine outlet and said heat exchanger inlet face.

14. The fluid flow diverter of claim 13, wherein said first distance is about 99% of said second distance.

15. The fluid flow diverter of claim 1, wherein at least one of said heat sink elements comprises an electric heater.

16. The fluid flow diverter of claim 1, wherein a first velocity of said fluid prior to said heat sink array is greater than or equal to about 5 times a second velocity of said fluid in contact with said heat exchanger inlet face.

17. The fluid flow diverter of claim 1, wherein said fluid, prior to said heat sink array, has a velocity greater than or equal to about 250 ft/sec, and a temperature less than or equal to about 32° F.

18. The fluid flow diverter of claim 17, wherein said fluid, in contact with said heat exchanger inlet face, has a velocity of less than or equal to about 50 ft/sec.

19. A flow diverter comprising:
a heat sink array in fluid communication with a turbine outlet and an inlet face of a heat exchanger,
said inlet face being in fluid communication with an outlet face of said heat exchanger,
said heat sink array comprising a plurality of hollow tubes having an outer surface separated from an inner surface by a wall thickness;
said inner surface of said plurality of hollow tubes being in thermal communication with a heat load,
said heat sink array being separated from said inlet face by a distance, and
said heat sink array being positioned between said turbine outlet and said inlet face such that at least a portion of a fluid flowing from said turbine outlet contacts said heat sink array before said portion of said fluid contacts said inlet face,
wherein said fluid has a uniform temperature distribution across an outlet of said heat exchanger.

20. The fluid flow diverter of claim 19, wherein said heat load has a temperature greater than the freezing point of water.

21. The fluid flow diverter of claim 20, wherein said outer surface of said hollow tube has a temperature greater than the freezing point of water while said outer surface is in contact with said portion of said fluid flowing from said turbine outlet.

22. The flow diverter of claim 21, wherein said outer surface of at least one of said plurality of hollow tubes is characterized by a cross section comprising a plurality of straight sides, a plurality of curved sides, or a combination thereof.

23. The flow diverter of claim 22, wherein said outer surface of at least one of said plurality of hollow tubes is characterized by an essentially triangular shaped cross section.

24. The flow diverter of claim 22, wherein said outer surface of at least one of said plurality of hollow tubes is characterized by an oval shaped cross section.

25. The flow diverter of claim 22, wherein said outer surface of at least one of said plurality of hollow tubes is characterized by an essentially diamond shaped cross section.

26. The flow diverter of claim 22, wherein said outer surface of at least one of said plurality of hollow tubes is characterized by an essentially tear-drop shaped aerodynamic cross section.

27. The flow diverter of claim 22, wherein said outer surface of at least one of said plurality of hollow tubes is characterized by an essentially circular cross section.

28. A fluid flow diverter comprising:
a heat sink array in fluid communication with a turbine outlet and an inlet face of a heat exchanger,
said heat sink array being separated from said inlet face by a first distance,
said heat sink array being positioned between said turbine outlet and said inlet face such that at least a portion of a fluid flowing from said turbine outlet contacts said heat sink array before said portion of said fluid contacts said inlet face,
said heat sink array comprising a plurality of hollow tubes,
said plurality of hollow tubes being angularly arranged to said fluid flowing from said turbine outlet,
said plurality of hollow tubes having an outer surface separated from an inner surface by a wall thickness, and
said inner surface being in fluid communication with a heat exchange medium, wherein said outer surface of at least one of said hollow tubes is located a second distance of about 5% to about 50% of a third distance between said turbine outlet and said inlet face.

29. The fluid flow diverter of claim 28, wherein said fluid has a uniform temperature distribution across an outlet of said heat exchanger.

30. The fluid flow diverter of claim 29, wherein said fluid prior to said heat sink array has a velocity greater than or equal to about 500 ft/sec, and a temperature less than or equal to the freezing point of water.

31. The fluid flow diverter of claim 30, wherein said fluid in contact with said inlet face has a velocity of less than or equal to about 50 ft/sec.

32. A fluid flow diverter comprising:
an expansion chamber having a turbine outlet at a first end and a heat exchanger inlet face at a second end located opposite to, and in fluid communication with, said first end,
a heat sink array comprising a plurality of heat sink elements disposed within said expansion chamber between, and in fluid communication with, said first end and said second end,
wherein a portion of a fluid entering said first end contacts said heat sink array prior to said fluid contacting said second end, and
wherein said heat sink array is positioned a distance from said second end.

33. The flow diverter of claim 32, wherein said heat sink array comprises a plurality of hollow tubes, each having an outer surface contactable with said fluid, each having an outer surface separated from an inner surface by a wall thickness, and each of said inner surfaces being in fluid communication with a heat exchange medium having a temperature greater than the freezing point of water.

34. The flow diverter of claim 33, wherein said plurality of hollow tubes are each arranged essentially perpendicular to said fluid flowing from said first end.

35. The flow diverter of claim 34, wherein said plurality of hollow tubes are each arranged essentially parallel to each other.

36. The fluid flow diverter of claim 35, wherein said plurality of hollow tubes are arranged in at least one plane disposed essentially perpendicular to said fluid flowing from said first end.

37. The fluid flow diverter of claim 36, wherein said plurality of hollow tubes are arranged in a plurality of parallel planes, each of said parallel planes disposed essentially perpendicular to said fluid flowing from said first end.

38. The fluid flow diverter of claim 37, wherein said plurality of hollow tubes are arranged in a staggered configuration.

39. The fluid flow diverter of claim 32, wherein a first distance between said first end and an outer surface of at least one of said heat sink elements is about 1% of a second distance between said first end and said second end.

40. The fluid flow diverter of claim 39, wherein said first distance is about 99% of said second distance.

41. The fluid flow diverter of claim 32, wherein at least one of said heat sink elements comprises an electric heater.

42. The fluid flow diverter of claim 32, wherein a first velocity of said fluid prior to said heat sink array is greater than or equal to about 5 times a second velocity of said fluid in contact with said second end.

43. The fluid flow diverter of claim 32, wherein said fluid prior to said heat sink array has a velocity greater than or equal to about 250 ft/sec, and a temperature less than or equal to the freezing point of water.

44. The fluid flow diverter of claim 43, wherein said fluid in contact with said second end has a velocity of less than or equal to about 50 ft/sec.

45. A cooling air system, comprising:
a heat exchanger;
a turbine having a turbine outlet in fluid communication with an inlet face of said heat exchanger,
said inlet face being in thermal and fluid contact with an outlet face of said heat exchanger,
said inlet face being disposed between said turbine outlet and said outlet face of said heat exchanger,
a heat sink array positioned between said turbine outlet and said inlet face such that at least a portion of a fluid flowing from said turbine outlet contacts said heat sink array before said fluid contacts said inlet face,
said heat sink array being separated from said inlet face by a distance,
said heat sink array comprising a plurality of hollow tubes,
said plurality of hollow tubes having an outer surface separated from an inner surface by a wall thickness,
said inner surface being in fluid communication with a heat exchange medium,
said plurality of hollow tubes arranged to said fluid flowing from said turbine outlet to provide a uniform temperature and air and entrained humidity distribution of said fluid across said inlet face.

46. A method of distributing a fluid to a heat exchanger, comprising:
expanding said fluid through a turbine having a turbine outlet in fluid communication with an inlet face of said heat exchanger,
diffusing said fluid through said turbine outlet;
contacting a portion of said fluid with a flow diverter arranged between said turbine outlet and said inlet face,
said flow diverter comprising a heat sink array comprising a plurality of heat sink elements,
said heat sink array being separated from said inlet face by a distance, and
said heat sink array being positioned between said turbine outlet and said inlet face such that at least a portion of a fluid flowing from said turbine outlet contacts said heat sink array before said portion of said fluid contacts said inlet face.

47. The method of claim 46, wherein said inlet face is in fluid communication with an outlet face, and wherein said fluid has a uniform temperature distribution across said outlet face.

48. The method of claim 46, wherein said heat sink array comprises a plurality of hollow tubes, each having an outer surface immersed in said fluid, each having an outer surface separated from an inner surface by a wall thickness, and each of said inner surfaces being in fluid communication with a heat exchange medium having a temperature greater than the freezing point of water.

49. The method of claim 46, wherein a first distance between said turbine outlet and an outer surface of at least one of said heat sink elements is about 1% of a second distance between said turbine outlet and said inlet face.

50. The method of claim 49, wherein said first distance is about 99% of said second distance.

* * * * *